Feb. 11, 1947.   C. A. ADAMS ET AL   2,415,573
WELDED STRUCTURE
Filed July 27, 1942   2 Sheets-Sheet 1

INVENTORS
Comfort A. Adams, and
Harold A. Strickland Jr.
BY John P. Tarbox
ATTORNEY Feb. 11, 1947. C. A. ADAMS ET AL 2,415,573
WELDED STRUCTURE
Filed July 27, 1942  2 Sheets-Sheet 2

INVENTORS
Comfort A. Adams and
Harold A. Strickland Jr.
BY John P. Torbot
ATTORNEY Patented Feb. 11, 1947

2,415,573

UNITED STATES PATENT OFFICE 2,415,573

WELDED STRUCTURE

Comfort A. Adams, Philadelphia, Pa., and Harold A. Strickland, Jr., Detroit, Mich., assignors to The Budd Company, Philadelphia, Pa., a corporation of Pennsylvania Application July 27, 1942, Serial No. 452,384

3 Claims. (Cl. 189—36)

1

The invention relates to structures which are electric resistance welded and more particularly to electric spot or seam welding.

An object of the invention is the elimination of the warping of welded sheets which is now quite common for thin gauge sheets welded by the customary welding methods.

Another object of the invention is the preservation of the strength of the material, especially of cold rolled material, in the regions at and surrounding the welded areas.

An object of the invention is also a more complete preservation of the anti-corrosion properties in and at the welding points of materials such as austenitic stainless steel, for instance of the 18% chromium-8% nickel variety.

Still another object of the invention is the improvement of the fatigue resistance of the material at and near the welded spots and the avoidance of residual stresses in general.

Among the objects of the invention is, furthermore, a weld having greater torsional strength per unit of welded area.

Among the objects is, moreover, the avoidance of fine cracks in or near the welds which often occurred hitherto and were starting points for extended strength destroying cracks; such fine cracks used to open up under vibratory stresses and were especially dangerous in such structures as fuel tanks for aircraft.

The aforesaid and other objects are achieved according to the invention by the making of welds the fused portions of which are very closely confined to the interface of the workpieces to be connected but which are nevertheless thoroughly and intimately tied into the adjoining structure of the workpieces. Welds of this type are achieved according to the invention by using an extremely high current for an extremely small fraction of a second in so balancing current and time that a complete bond of the interface of the welding spot takes place, yet without bringing the outwardly adjoining portions of the material to welding temperature aand without annealing any substantial parts of the material adjoining the thin welding nugget and especially without annealing the outer surfaces of the workpieces. The molten material of the new welds may have the form of a thin flat disc or wafer or it might even take the form of a flat thin annulus or doughnut.

The concentration of a great amount of energy and the dissipation of the latter in extremely short time into the weld is achieved by the use of stored-energy welding equipment,

2 preferably of the capacitor type. With the capacitor type equipment, the aims of the invention are achieved by so selecting the capacity with respect to resistance and inductance of the welding circuit that the welding current is rushed through the weld in the desired extremely brief period of time.

It has often been proposed to use "short," "very short" or "extremely short" welding times coupled with correspondingly high currents. Some of these proposals found wide adoption in practice. Yet, the known methods and their results differ fundamentally from the new procedure even though the description of the invention might at first glance suggest great similarities.

The aim of the known welding methods using so-called "very short" times were welds with nuggets extending over a considerable part of the thickness of the workpieces; at least a penetration of about 50% or more was deemed necessary to obtain full strength welds.

Regarding the previously known welding methods with short times and high currents, extensive experiments revealed the astonishing fact that the shortening of time beyond a certain limit led either to a welding nugget having in cross section marginal horns which often extended to the outer surfaces of the workpieces, or, if the current was reduced so as to avoid the horns, led to incipient welds only, i.e., welds with imperfect bond and consequently insufficient strength and durability. The aforesaid horns are highly undesirable because they mean complete recrystallization and destruction of the cold-rolled strength right up to the surface and often mean, moreover, an inadmissible destruction of the corrosion resistance of the material.

The result of these experiments was that all welds made for actual production within so-called "extemely short" times were made with times which are many times higher than those contemplated by the inventor. Even for a known stored energy welder with means for cutting off the oscillations following the first surge of current, the welding time was considered to be in the order of one one-hundredth of one second or less.

Applicants made the surprising discovery that by jumping from the hitherto customary "extremely short" times far below those unsuccessfully attempted still shorter times, and by balancing time and current, welds are obtained which not only avoid the shortcomings of the previous attempts but which are in many respects far superior to the welds made by the best methods hitherto in practice.

A serious disadvantage of even the best spot or seam welding methods hitherto found practicable, when applied to thin sheets such as the outer skin of airplane wings, consisted therein that warpings and distortions of the sheets occurred. An explanation for the occurrence of such warpings and distortions is that during the welding operation the heated metal expands and compresses the surrounding material and that afterwards during the cooling the heated material contracts, whereas the surrounding material and the fused or bonded material itself are not able to follow such contraction. Internal tension stresses in the material are the result, which, if the welded nuggets are relatively great in comparison with the surrounding material, will lead to the aforesaid warpings and distortions. It was found, for instance, that two strips of thin gauge austenitic stainless steel after having been welded together by the ordinary short-time welding methods by 60 spots along the length of one foot, contracted from about .003 to about .021 of an inch depending upon the material and its condition—annealed or cold-rolled. No contraction was observed in welding together similar strips by the same number of welds made according to the new method. The explanation for the absence of warpings and distortions in pieces welded by the new method may be found therein that the fused material constitutes such a thin layer and that the surrounding material is so unaffected or little affected by the welding that the expansion and contraction of the fused or bonded material cannot exert forces great enough to overcome the resistance of the surrounding material.

Applicants have the following theory for their invention. The current is sent into the overlapping parts at such an extremely high rate and for such an extremely short time that only the zone or zones of highest electrical resistance and of poorest thermal cooling are brought to bonding fusion temperature, whereas the zones of small electrical resistance and better cooling are not even brought up to annealing temperature. Those zones of highest resistance and poorest cooling are at the outset the overlapping surface layers of the workpieces; the high resistance is due to the interruption at the interface and the poor cooling is due to the remoteness from the cooling effect of the electrodes.

As soon as fusion starts at the interface, the transition resistance of course disappears, but is in part replaced by the increase of resistivity of the thin layer of hot or fused metal.

Since the success of the new process depends upon delivering the welding current energy so quickly that the heat developed at the interface cannot be carried away by conduction to any undesirable extent before the welding is finished, the time of current flow should be reduced in almost proportion to the thermal resistivity or inversely as the thermal conductivity. As compared with the thermal resistivity of austenitic stainless steel containing about 18% chromium and 8% nickel, the thermal resistivity of mild steel is ½ and that of aluminum $\frac{1}{10}$. This means that the periods of current flow should be reduced in about these same proportions for the same percentage of heat leak from the interface zone.

Theoretical calculations indicate that the permissible welding time should be about .001 second for austenitic 18–8 stainless steel, .0005 second for mild steel, .0001 second for aluminum and about ½ of the latter for copper. For other alloy steels the time would lie between those for 18–8 and mild steel.

Actually made welds proved the theoretical calculations to be correct with fair approximation. Yet it is well conceivable the longer periods might be used without sacrificing the desired result especially as far as residual stresses are concerned.

Irrespective of whether or not applicants' theory is correct, the fact remains that the new welding method comprises thin disc, wafer or doughnut shaped weld nuggets of very small penetration, and that the surrounding material, especially the outer surfaces of the workpieces, do not show any consequential changes as go invariably with welds made by the known methods. In cold-rolled material, the cold-rolled properties are not even destroyed in the zones between the weld nugget and the outer surfaces or at least not in the zones adjacent and including the outer surfaces. It is obvious that such welds have to result in strong structures because there are no annealed zones extending all the way across the material as was the case in all structures welded by the best hitherto known welding methods.

Another advantage which is due to the thinness of the fused material and the comparative great thickness of the unaffected surface material consists in the complete or nearly complete absence of welding marks.

The explanation for the higher fatigue resistance resides probably in the avoidance of residual stresses or in the absence of annealed zones around the welds. Experience shows that the fatigue resistance of structures spot or seam welded by the old methods practically invariably broke down in zones surrounding the welds. The breakdown may be attributable to the annealing, to other changes in the metallographic structure or other factors.

The life of the electrodes in welding machines or the frequency with which the electrode tips have to be redressed depends largely on the temperature to which the electrodes are heated. The new process leaves the electrodes much cooler than in the old procedures. This again means a great saving of electrode material and also of time hitherto used for redressing or changing electrode tips. This situation entails the further advantage that cooling of the electrodes by fluid may under favorable conditions be dispensed with altogether. Furthermore, the aforesaid situation allows the use of copper electrodes with their low electrical resistance and their low price instead of high priced copper-alloy electrodes with higher electrical resistance which for the new process is, of course, especially undesirable.

The thinness of the weld wafer or nugget coupled with the absence of practically any heating of the surrounding regions means obviously a reduction of the electric energy necessary for making a weld. It had, of course, been recognized before that shortening of the welding time means saving of energy, but it had not been recognized that the thickness of the weld nugget or waffle could be reduced without loss of strength. It had, moreover, not been recognized that by balancing of time and current it is possible to overcome the obstacles which prevented hitherto the radical reduction of welding times, such obstacles being, as explained hereinbefore, welds with horns or imperfectly fused welds. Whereas, for instance, for a certain thickness of work the energy consumption per weld hitherto amounted to 500 joules, the energy consumption per weld made in accordance with the invention is about 80 joules.

The size of the equipment necessary for carrying out the new process and for obtaining the new type welds can be still further reduced by making more welds of smaller diameter instead of fewer welds of greater diameter.

Further objects, advantages and features of the new welding method and of the new welds, and specific features of the welding equipment used for these purposes, will become apparent from the following description of several embodiments and examples in conjunction with the attached drawings.

Figure 1:
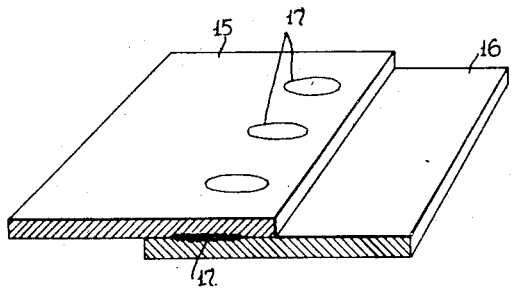
Figure 1 is an enlarged diagrammatic perspective view, partly in section, of two overlapping sheets joined by waffle-type welds embodying the invention.

Figure 1 shows two pieces 15 and 16 of sheet metal which are joined together by spot welds 17. The bonded fused parts of the welds 17 are in the form of a thin disc or wafer and have a thickness of only a small fraction of the combined thickness of the sheets 15 and 16. The thickness of the weld wafer or disc 17 may be in the order of but $\frac{1}{10}$ of the total thickness of the sheets. The material surrounding the bonded portions 17 is practically unaffected by the welding heat, and, above all, it is not annealed to the outer surfaces.

Figure 2:
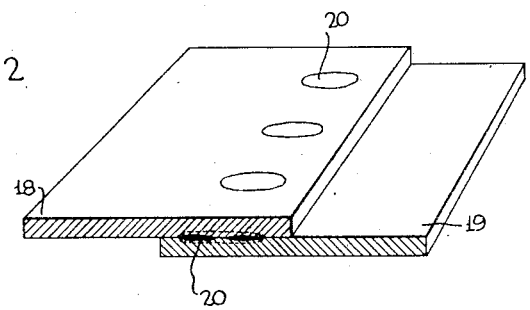
Figure 2 is a view similar to Figure 1 but showing doughnut-type welds.

The pieces 18 and 19 shown in Figure 2 are connected by ring- or doughnut-shaped welds 20. This form of welds may be obtained by certain ratios of welding time, current, form and pressure of electrode tips, work thickness and physical properties of the material of the work. The ring or doughnut weld has a great resistance against torsion per unit of actually welded area owing to the distance of the fused portions from the center of each weld. The explanation for these ring-shaped welds may be found in the skin effect.

The welding equipment may comprise supply conductors 21, 21' carrying alternating current of, for instance, 3000 volts. This current may be supplied over a transformer (not shown) from the regular public supply source. The conductors 21, 21' are connected to a rectifier 22 which feeds direct current into conductors 23, 24 of which at least the one comprises a switch 25. Conductors 23, 24 are connected to a capacitor 26 which by means of conductors 27, 28 is connected to the ends of the primary 29 of a welding transformer, the conductor 27 including the switch 30. The secondary 31 of the transformer feeds by means of conductors 32, 33 the welding electrodes 34, 35 between which the work 36 may be placed. The ratio of the transformer windings 29, 31 is such that voltage of the current in the secondary is but a few volts, say, for instance, 4 to 6 volts. Reactors 37, 38 may be inserted in the supply conductors 21, 21' or a resistor 39 may be inserted in the conductor 23.

The operation of the diagrammatically illustrated device is as follows: After having closed the switch 25 and opened the switch 30, the capacitor 26 is charged over the supply conductors 20, 21, the rectifier 22 and the conductors 23, 24. After reaching sufficient charge and clamping the work 36 between the electrodes 34, 35, the switch 25 is opened and switch 30 closed. Hereupon the capacitor 26 discharges through the primary 29 of the transformer and induces the welding current in the secondary circuit 31 to 35. This discharge takes place in an extremely short time, such as in 1/1000 to 1/1200 of a second or even less. It is therefore highly important that the length of the conductors 32, 33 up to the tips of the welding electrodes 34, 35 be kept as short as possible so as to avoid excessive inductance losses.

A shunt 40 may be inserted between the conductors 27, 28, allowing the capacitor to send one unidirectional current impulse only through the transformer whereas subsequent oscillations are suppressed. The shunt may be of the type comprising an Ignitron tube controlled by a Thyratron tube.

Figure 3:
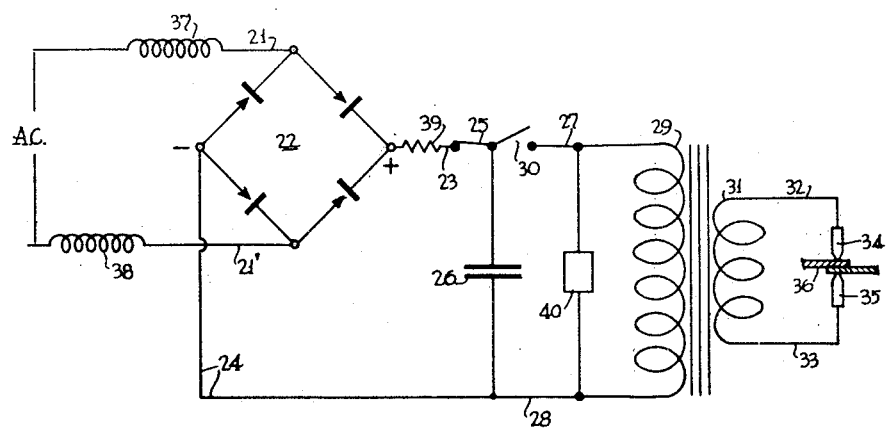
Figure 3 is a diagram of the wiring of welding equipment for carrying out the new method and for obtaining the new welds.

The details of the welding machine are not shown because they may be substantially of conventional construction. The switches 25 and 30 may, as diagrammatically indicated in Figure 3, be coupled so that upon opening of the one the other will be closed, and vice versa. The machine is, of course, equipped with means for forcing the electrodes together, such as a fluid cylinder and piston arrangement.

It is important that a transformer of low inductance and of low magnetic reluctance be employed. A type of transformer which, though originally designed for ordinary spot welding, proved highly practical for carrying out the invention is disclosed in the copending application Serial No. 412,235, filed September 25, 1941 (now Patent No. 2,349,835, dated May 30, 1944), Harold A. Strickland, Jr., for "Welding tool."

It is, as said before, of outstanding importance that the resistance and impedance in the welding circuit be kept as low as possible because otherwise the short welding periods would not be obtainable. This condition applies, however, mainly to the secondary only. A further means of aiding in fulfilling the aforesaid condition consists in using a portable welding gun which contains a transformer of such small size and low weight as to allow the easy handling of the gun. With such a gun the transformer can be brought close to the welding spots avoiding long secondary leads to electrodes. A transformer and welding gun disclosed in the hereinbefore mentioned Strickland application fulfill also the above-outlined additional requirements.

The amperes sent through the work at the points of the electrodes 34 and 35 may be in the order of 50,000 to 100,000 amperes. The power input may be in the order of between 800 up to 4000 k. v. a. The size of the capacitor 26 may be in the order of 400 microfarads. The power factor may be in the order of 20%. The ratio of the transformer 29, 31 may be about 50:1.

Figure 4:
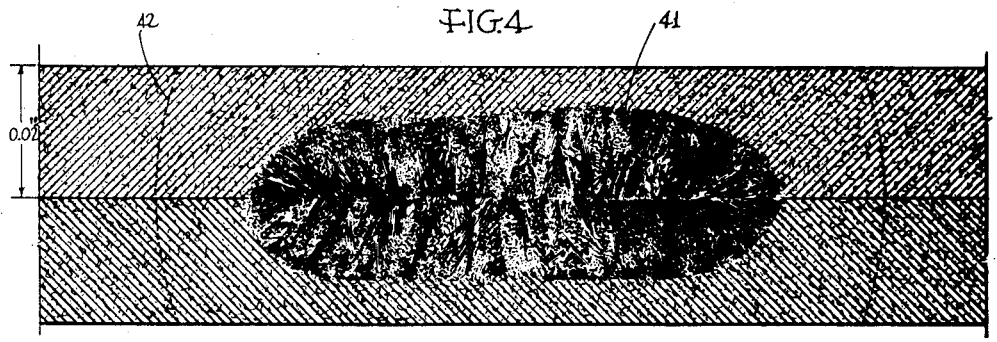
Figure 4 represents a photomicrograph through a weld made according to the method of Patent No. 1,944,106.
Figure 5:
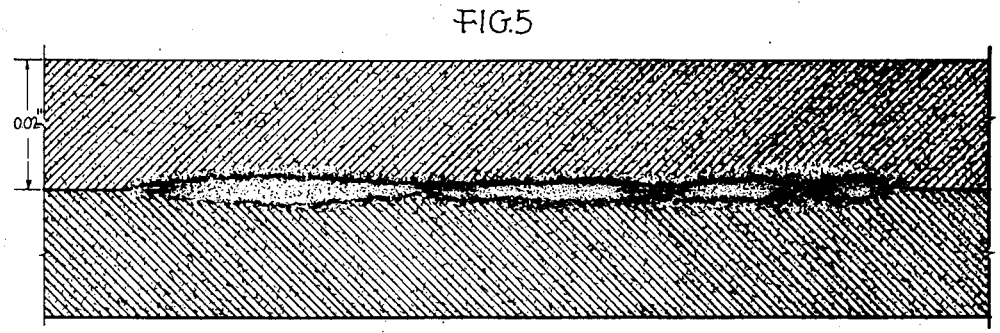
Figure 5 represents a microphotograph through a weld according to the invention in highly cold-rolled austenitic stainless steel of the 18% Cr/8% Ni variety.
Figure 6:
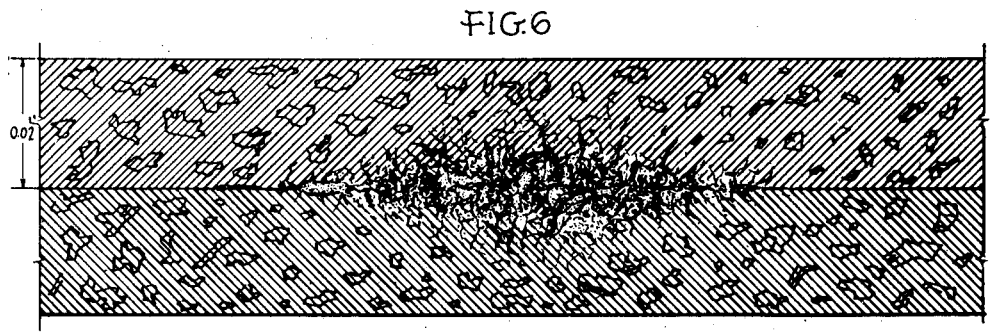
Figure 6 represents a photomicrograph through a weld according to the invention in the same material as Figure 5, yet in annealed condition.

A clearer picture of the invention may be gained from Figures 4 to 6 representing photomicrographic sections of actually made welds.

Figure 4 represents a weld which is not made according to the invention but which is made in accordance with the best hitherto known method, that is, in accordance with Patent 1,944,106 of Ragsdale. This figure shows a weld made on .02" stainless steel containing about 18% chromium and 8% nickel. The weld nugget 41 indicates that the metal was actually brought to melting temperature. The size of this nugget 41 and the heat supply to the welding zone was such that the surrounding material to the dotted line 42 was brought to annealing temperature. This means that, if the weld is made in a material the strength of which has been increased by cold working, such cold-working strength is destroyed in the region surrounding the nugget 41 and surrounded by the dotted line 42.

Figures 5 and 6 represent welds made in accordance with the invention on the same type of material, that is, austenitic stainless steel containing about 18% chromium and 8% nickel. The material shown in Figure 5 is stainless steel the strength of which has been increased by cold working up to 150,000 pounds per square inch, whereas Figure 6 shows the same material in dead soft condition.

The weld shown in Figure 5 was made with a condenser capacitance of 400 microfarads and a voltage at the condenser of 1600 volts. The area of the resultant weld is about .0275 square inch. The total electrode pressure was about 900 pounds corresponding to 32,700 pounds per square inch. The welding time was .001 second and the welding current 30,000 amperes, corresponding to a current density in the welded area of 1,090,090 amperes per square inch.

The actual sample illustrated in Figure 5 showed at some distance around the weld a narrow annulus zone of fused metal which is probably attributable to the skin effect coupled with arcing between the circumference of the electrode tips and the workpieces. The surface of this annular zone is included in the above computation of current density and weld area. By a slight change of one or more of the factors entering into the situation, such as the form of electrode tips, spitting and the additional annular welding zone is avoidable, or, on the other hand, an annular weld as diagrammatically illustrated in Figure 2 to the exclusion of a central portion is obtainable.

A comparison between the welds shown in Figures 4 and 5 reveals that also the weld of Figure 5 is firmly bonded but in all probability not brought to actual melting temperature, whereas the weld nugget of Figure 4 constitutes a small ingot of material which was brought actually to the molten state during the welding.

The weld in dead soft stainless steel illustrated in Figure 6 was made with a condenser capacitance of 320 microfarads and a voltage of E=740 volts. The electrode pressure amounted to about 350 to 400 pounds. The diameter of the weld is about .1". It is apparent that the nature of the weld made in the dead soft material shown in Figure 6 is quite different from that of the weld in cold-worked material as shown in Figure 5. There is in Figure 6 a layer of bonded material along the interface which branches out by following the grain boundaries. By these branches, the weld is firmly anchored into the adjoining material.

Neither one of the samples illustrated in Figures 5 and 6 reveals any appreciable annealing adjacent to or at a distance from the actual weld nugget. Therefore, the strength of the material is unimpaired, and there is moreover in high-carbon stainless steel no zone of the highly objectionable carbide precipitation.

Depending upon the material to be welded, the condition in which the material is—annealed, heat treated or cold rolled—the thickness of the pieces to be welded together, etc., depends of course on the amount of current to be used and the time to be employed as well as the size and material of the electrodes, the electrode dresser, etc. Yet it is a commonly known fact to those skilled in the art that for each type of welding all the factors have to be adjusted within certain limits.

The invention is not restricted to the described and illustrated embodiments but is capable of many modifications, variations and changes without departure from its basic principles which are intended to be covered by the appended claims.

What is claimed is:

1. A welded structure resistant to bi-axial stresses comprising plural overlying metal parts welded together by passing relatively high currents in short time intervals through the compressed interface thereof to form nuggets, the transition surface of each weld between nugget and unmodified part material having pronounced concave contours forming spaced peaks between which anchoring masses of unmodified metal intervene.

2. A welded structure resistant to bi-axial stresses comprising plural overlying metal parts welded together by passing relatively high non-arcing currents in short time intervals through the compressed interface thereof to form weld nuggets, the nugget surface throughout its entire area being characterized by pronounced irregularity of surface whereby the nugget interlocks with the unmodified part material.

3. A welded structure formed of superposed parts joined by displaced interface resistance welds, each weld having annular concentric sections of relatively different thickness in the direction perpendicular to the weld interface.

COMFORT A. ADAMS.
HAROLD A. STRICKLAND, Jr.

REFERENCES CITED

The following references are of record in the file of this patent:

UNITED STATES PATENTS

| Number | Name | Date |
|---|---|---|
| 2,287,540 | Vang (I) | June 23, 1942 |
| 2,287,544 | Vang (II) | June 23, 1942 |
| 1,066,468 | Chubb | July 8, 1913 |
| 2,202,899 | Colwell | June 4, 1940 |
| 2,179,105 | Sidney | Nov. 7, 1939 |
| 2,159,916 | Vang (III) | May 23, 1939 |
| 2,218,977 | Weisbecker | Oct. 22, 1940 |
| 1,259,271 | Murray | Mar. 12, 1918 |
| 1,293,867 | Murray | Feb. 11, 1919 |
| 2,302,119 | Hagedorn | Nov. 17, 1942 |
| 2,145,724 | Horsley | Jan. 31, 1939 |
| 1,944,106 | Ragsdale | Jan. 16, 1934 |
| 2,372,147 | White, et al. | Mar. 20, 1945 |

FOREIGN PATENTS

| Number | Country | Date |
|---|---|---|
| 626,598 | German | Feb. 28, 1936 |

OTHER REFERENCES

Axtell et al., "Capacitive Stored Energy Systems of Spot Welding," The Welding Journal, Feb. 1941, pages 117–122, particularly pages 119 and 120.

Babat, "High Voltage Condenser Welding," The Welding Journal, Aug. 1935, pages 6, 7 and 8.

Hughes, "Fundamental Data Pertaining to Resistance Welding," Welding, Feb. 1932, page 85.

Hutchins, "Resistance Welding Improved by Thyratron Control," General Electric Review, Mar. 1937, page 117.

Mikhalapov et al., "Scope and Limitations of Stored Energy Type Spot-Welding Equipment," The Welding Journal, Nov. 1940, pages 820, 833, inclusive.

The Welding Journal, March 1939, page 169, and page 79 of Welding Research Supplement.